May 5, 1959  P. D. WURZBURGER  2,884,981
COUPLING NUT WITH CAM OPERATED PIN MEANS FOR RELEASABLY
ENGAGING A NUT LOCKING MEANS
Filed March 25, 1954  3 Sheets-Sheet 2
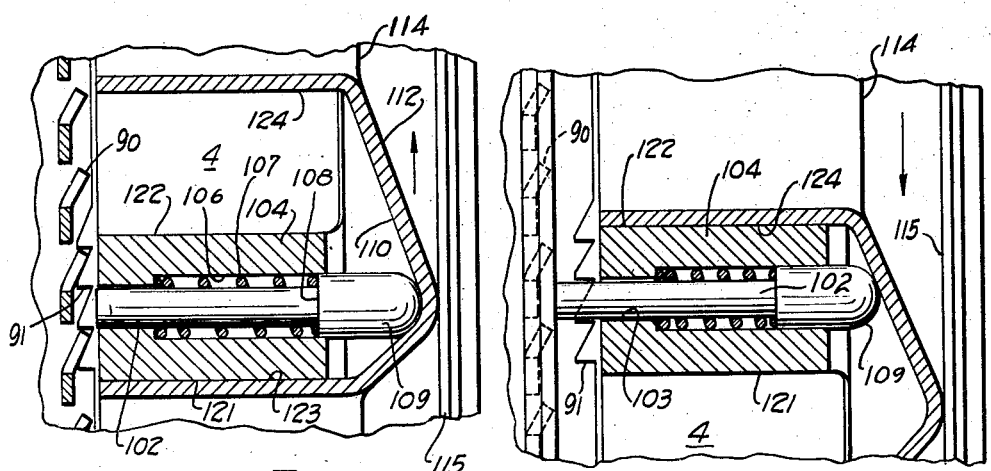
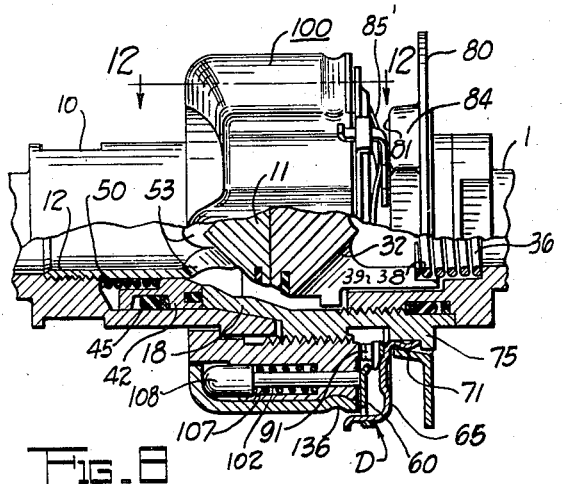
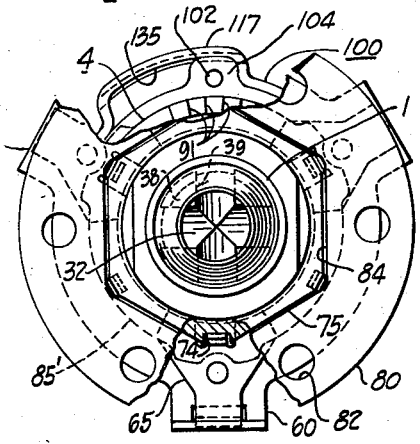
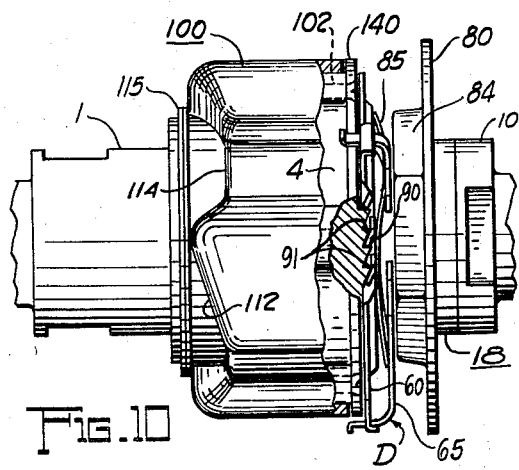
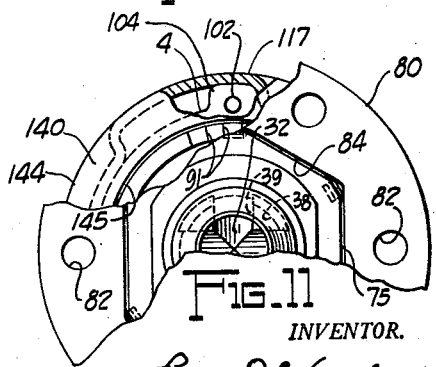
INVENTOR.
BY Paul D. Wurzburger
George Knowles
ATTORNEY

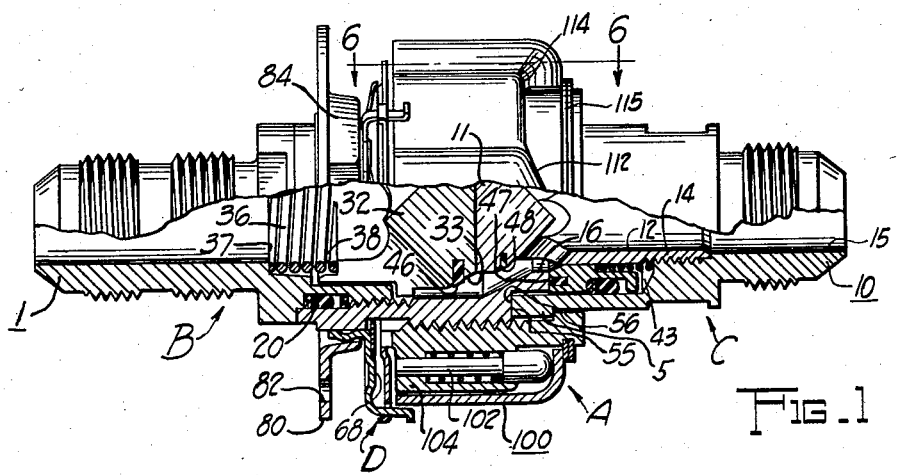

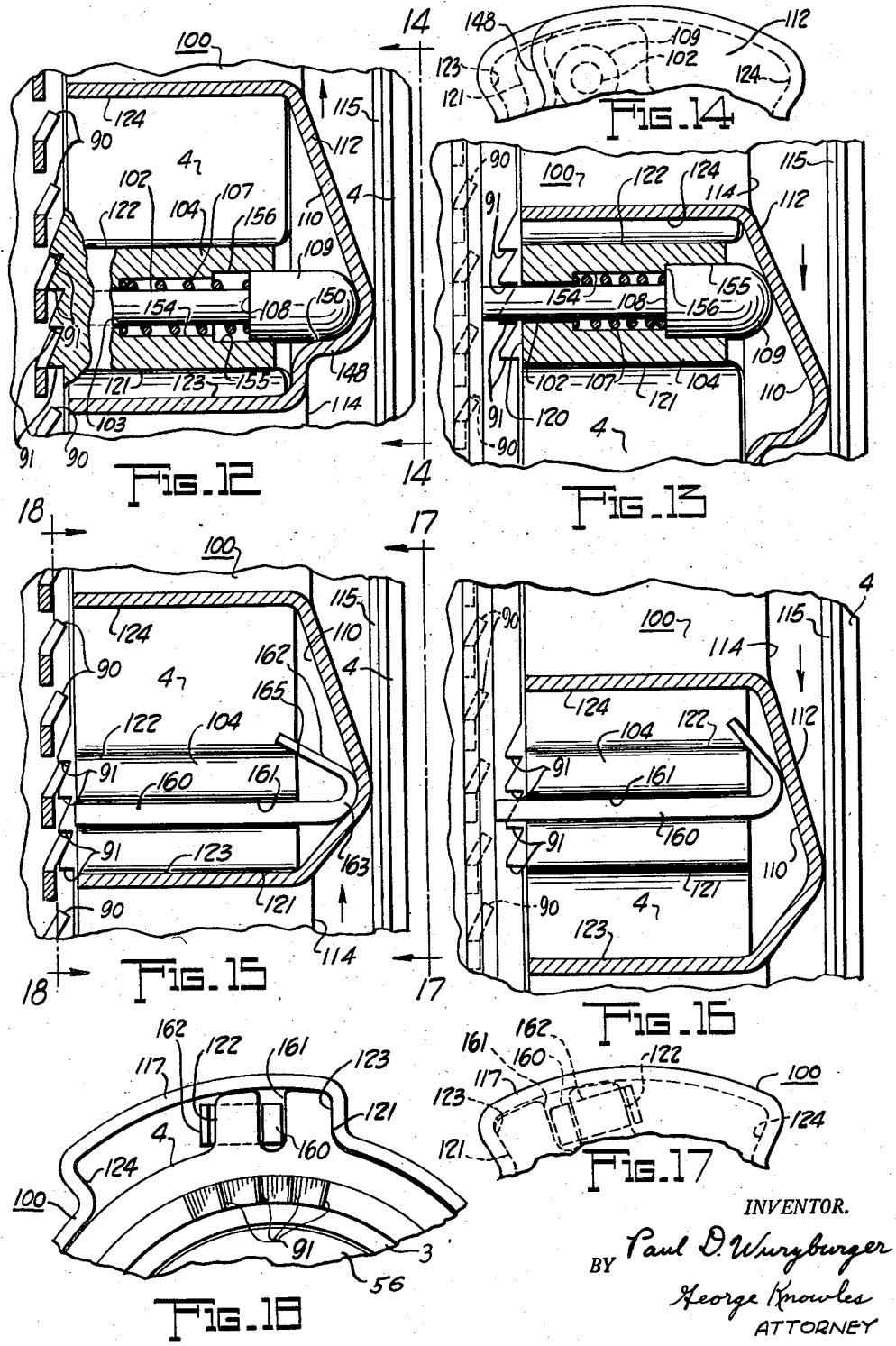

United States Patent Office 2,884,981
Patented May 5, 1959

2,884,981

COUPLING NUT WITH CAM OPERATED PIN MEANS FOR RELEASABLY ENGAGING A NUT LOCKING MEANS

Paul D. Wurzburger, Cleveland, Ohio

Application March 25, 1954, Serial No. 418,623

6 Claims. (Cl. 151—39)

This invention relates to coupling devices of the type comprising separable parts assembled in coaxial end to end relation, more particularly to such devices in which the coupled parts are releasably interlocked against uncoupling. The parts that are coupled may be the end fittings of tubes or pipes which may or may not contain one or more valves. The invention is also applicable to constructions in which one of the parts is a retainer such as a nut or is a closure such as a cap or plug.

Devices of the character referred to having interlocking parts are presently known, one form comprising a composite union nut having tubular inner and outer members telescoped one over the other and arranged for both relative axial and relative rotative movement. The inner member of the nut is formed as with internal threads for engaging a companion coupling part. Such inner member may also have external quick pitch threads opposite in direction to the internal threads, the external threads being engaged by similar threads on the inside of the outer nut member. By this arrangement the above mentioned axial shifting of the outer nut member relative to the inner nut member is obtained upon relative rotation of the outer member about the inner. This axial shifting is utilized to effect release of the interlock between the coupling parts. Such a construction is complicated and expensive to manufacture, due particularly to the difficulty of machining the quick pitch threads. The construction is not completely satisfactory because of the possibility of jamming and seizing of parts.

It is therefore one of the principal objects of the present invention to provide an improved nut structure for use in a coupling device of the character referred to having automatic locking and unlocking features, particularly to provide such a nut structure which eliminates relative axial movement of the inner and outer members and which avoids jamming and seizing of the parts in use. More specifically it is sought to provide for use in such a coupling device a coupling nut construction without threaded connection between the inner and outer nut members and wherein, for disengaging the locking component or ring of a companion coupling part, a series of axial pins guided for endwise movement by one of the nut members are arranged to be actuated as by cam surfaces on the other of the nut members. As a refinement of this aspect of the invention the pins are carried in and guided by the inner member of the coupling nut, being distributed about its circumference at equally spaced points, and are engaged simultaneously by cams formed on or carried by the outer member of a nut so as to be shifted axially in unison upon turning of the outer member on the inner member of the nut. Such axial shifting of the pins is utilized in effecting release of the interlocking connection between the coupling nut and the locking ring of the companion coupling part so that the parts can be unscrewed or otherwise separated in the usual manner.

In the coupling nut structure of the present invention the inner member is of such shape and design as to be adapted for manufacture as a metal extrusion requiring a minimum number of machining and finishing operations. The outer member is of such shape and design as to permit of its manufacture by forging or stamping, thereby permitting the use of sheet material having good physical properties and resulting in an outer nut member that is light in weight while yet being tough, strong and durable. These features are objectives of the invention.

In the preferred arrangement the inner and outer members are formed one with integral radial lugs or ears and the other with radial recesses which receive the ears so that turning torque may be transmitted from one member to the other. The recesses are of greater extent circumferentially of the nut structure than are the lugs or ears, so that limited relative rotative movement of the members is obtained. This relative movement is utilized in effecting the axial movement of the release pins referred to above. As a still further refinement of the lug-recess arrangement the lugs are formed as integral parts of the inner body member, which may be the extrusion referred to above, and the recesses are provided by embossing the annular wall of the outer cap member, which may be the stamping referred to above. In such case the lugs are advantageously extended axially over the major portion of the length of the inner nut body to provide axially wide radial surfaces adequate for engagement by complemental radial surfaces at the sides of the circumferentially elongated recesses in the cap. The turning torque is thus transmitted between the members at a plurality of points distributed about the circumference of the nut structure.

The construction of the radial lugs in the form of axially elongated integral bosses on the inner body member also affords ample stock in the lugs for location therein of the bores which receive the axially slidable release pins. This use of release pins and their disposition in the torque transmitting and movement limiting lugs permits generally thinner metal sections than have been heretofore feasible, with attendant advantages in reduction of weight and over-all diameter. The stamped outer cap or sleeve obtains not only the advantages of lightness, economy and reduction in size but also the formation of external knobs or radial protuberances resulting from the embossment of the annular wall. Such protuberances constitute gripping means for use in manually turning the nut structure or, by judicious selection and placement of the embossments, are adapted to receive a conventional wrench or other turning tool.

A still further object of the invention is to provide a coupling nut construction for use in association with a locking component or ring or the like on a companion coupling part, which nut is of simple design and construction and easy and inexpensive to manufacture. The objects and advantages referred to and others are apparent in the following detailed description of the invention made in connection with the accompanying drawings forming a part of the specification.

In the drawings:

Figure 1 is an elevational view, partly in section and with parts broken away and removed, of a valved coupling or union for connecting the ends of fluid conduits such as tubes used in the hydraulic systems of aircraft, the present invention being particularly concerned with the union nut of the device;

Figs. 2 and 3 are elevational views, partly in section and with parts broken away and removed, showing disassembled the left- and right-hand parts, respectively, of the coupling device of Fig. 1;

Figs. 4 and 5 are elevational views, partly in section and with parts broken away and removed, of the front and rear ends, respectively, of the coupling part shown in Fig. 3 which carries the nut structure of the present invention;

Fig. 6 is a diagrammatic sectional detail taken as though along the line 6—6 of Fig. 1 and enlarged with respect to that figure to show the relationship between the annular body of the locking ring structure, one of the axially slidable release pins and the cam for actuating such pin;

Fig. 7 is a diagrammatic sectional detail similar to Fig. 6 showing the relationship of the parts upon cam actuating movement of the outer nut member to shift the release pin axially and thereby effect separation of the locking ring teeth from the nut teeth;

Fig. 8 is a fragmentary elevational view, partly in section and with parts broken away and removed, of an interlocking coupling assembly similar to Fig. 1 showing a modification of the invention;

Fig. 9 is an end elevational view, partly in section and with parts broken away and removed, of the coupling assembly of Fig. 8;

Fig. 10 is a fragmentary elevational view, partly in section and with parts broken away and removed, similar to Fig. 1, showing an interlocking coupling member and illustrating another modification of the invention;

Fig. 11 is a fragmentary end elevational view, partly in section and with parts broken away and removed, of the coupling structure of Fig. 10;

Fig. 12 is a fragmentary diagrammatic sectional detail taken as though along the line 12—12 of Fig. 8 and enlarged with respect to that view to show the relationship between the annular body of the locking structure, one of the axially slidable release pins and the outer member or sleeve of the nut, this view showing the function of the release pin as a stop limiting the relative rotative movement of the outer nut member or sleeve on the inner nut member;

Fig. 13 is a diagrammatic sectional detail similar to Fig. 12 showing the projection of the release pin by the action of the cam on the outer nut member and the bottoming of the release pin to limit the relative rotative movement of the outer nut member on the inner;

Fig. 14 is a fragmentary elevational detail, partly in section and with parts broken away and removed, showing a portion of the rear end of the nut assembly of Fig. 12, this view being taken substantially along the line 14—14 of that figure;

Figs. 15 and 16 are diagrammatic sectional details similar respectively to Figs. 6 and 7 showing a further modification of the invention;

Fig. 17 is a detail similar to Fig. 14 showing a portion of the rear end of the nut assembly of Fig. 15, this view being taken substantially along the line 17—17 of that figure; and Fig. 18 is a fragmentary end elevational view taken substantially along the line 18—18 of Fig. 15, the locking ring structure being removed.

The present invention is illustrated as it is embodied in union nut A of a coupling assembly comprising separable parts B and C, the union nut being carried by the latter and a locking structure D with which the nut is associated in assembly being carried by the former. It is understood, of course, that the principles of the present invention are useful in other types of devices and have numerous applications.

COUPLING ASSEMBLY—GENERAL ARRANGEMENT

Briefly described, the coupling parts B and C comprise tubular bodies 1 and 10, respectively, each having circular sectioned ends for conventional connection to the tubular conduits of the system in which the coupling is employed. The coupling part B is formed at its other or front end with external threads 2 which may be of the multiple or quick pitch type, these threads being engaged by corresponding internal threads 3 formed internally of internal body member 4 of the union nut A. The coupling part B comprises the circular sectioned tubular body 1 and a tubular extension 18 on which are formed the external coupling threads 2. The tubular extension 18 is internally threaded and screwed onto the externally threaded front end of the tubular body 1, as indicated at 19. A suitable seal, such as an O-ring 20, of rubber or the like is disposed in an annular recess between the parts to prevent escape of fluid out the coupling part through the threaded section 19.

The nut A is received embracingly about the body part 10 of the coupling part C, the latter having a radial outwardly projecting front end flange 5 in the provision of a circumferentially continuous shoulder 6 engaged in overlapping relation by an inwardly directed circular flange 7 on the rear end of the inner nut member 4 to lock or hold the parts together against axial separation. The nut A is, of course, rotatable on the body 10 of the coupling part C in screwing the nut onto the threads 2 of the coupling part B.

As the coupling parts are first brought together axially, a circular valve seat member 11 formed or carried on the end of a tubular element 12 threaded or otherwise secured in a counterbore 14 in internal axial passage 15 of the coupling body 10 is received guidingly and by an easy fit in a circular pilot opening 16 in a reduced diameter tubular end portion 17 which projects axially beyond the threads 2 of the coupling part B.

Within chamber 30 provided in the coupling part B by the tubular extension 18 and guided by the cylindrical internal walls of the latter for axial sliding movement is a valve body 32 having at its front end a frustoconical surface 33 that sealingly engages a mating seat or surface inside the front end of the extension 18. The valve body 32 is urged or biased to the right, as viewed in Figs. 1 and 2, by a helical coil compression spring 36 which acts between a radial shoulder 37 formed by a counterbore in the coupling body 1 and radial shoulders 38 on a plurality of parallel axial extensions 39 of the valve body 32. These extensions, four in number, are formed by milling through the circular sectioned metal stock from which is formed the body 32, the milling being done in intersecting radial planes by a cutter having a curved edge that shapes curved wall passages symmetrically about the axis of the coupling part. In the drawing together of the coupling parts by the screwing of the nut A onto the threads 2 the projecting front end of the valve seat member 11 of the coupling part C is received through the pilot passage 16 and forced into endwise engagement with the valve body 32, displacing the latter to the left as to the position shown in Fig. 1, in which the end surface 33 of the valve body is moved away from its companion valve seat to thereby open the passage through the coupling part B. The extensions 39 of the valve body 32 are each triangular in section. They guide the movement of the valve body and form the curved wall passages between them which permit substantially unimpeded flow through the coupling part.

While the valve 32 is thus being displaced in the assembling of the coupling parts, circular end face 40 of the reduced end 17 on the part B is received against a mating end face 41 of a sealing annulus or ring 42 slidingly received for axial movement over the tubular element 12 and within a cylindrical chamber 43 formed as by a counterbore in the tubular body 10 of the coupling part C. A suitable seal is provided between the ring 42 and the coupling body 10, such, for example, as a rubber O-ring 45 with the usual backing washer or washers of leather or plastic.

Suitable deformable seals such as synthetic rubber rings 46, 47 and 48 are recessed into annular radial and axial grooves in the sealing faces 33 and 41, respectively, and in an annular radial groove in the sealing face of the seat member 11. These rubber seals project slightly from the surfaces of the members in which they are recessed and are thus compressed when the parts are brought together. These seals may be cemented or vulcanized in place, although it is adequate to hold them by press fitting.

A helical coil compression spring 50 interposed between an internal shoulder of the body 10 and the sealing ring 42 biases the ring toward and into sealing engagement with a tapered or frustoconical surface of the valve seat member 11 to close the annular opening into the axial passage through the coupling part. The tubular element 12 is formed with radial openings 53 for the flow of fluid between the central axial passage in the coupling part and the annular opening about the valve seat member 11.

The pressure of the end 17 of the coupling part B against the sealing ring 42 during the assembling together of the coupling parts forces the ring 42 away from the valve seat member 11 substantially to the displaced position shown in Fig. 1, this movement compressing the spring 50 and opening an annular passage surrounding the valve seat member 11 at the front end of the coupling body 10. The limit of the movement together of the coupling parts is determined by engagement of annular end face 55 of the coupling body 10 against an annular radial shoulder 56 on the end of the tubular extension 18 of the coupling part B. In the assembled condition the coupling parts are held rigidly together and the movable seals or valve bodies 32 and 42 are displaced from sealing engagement with their respective seats to provide a continuous through passage from one end of the coupling device to the other, as shown in Fig. 1.

Notched locking structure

During the final stage of the assembly operation an interlock is effected between the coupling nut A and the notched locking structure D carried by the coupling part B. This locking structure, which forms the principal subject matter of copending application for patent Serial Number 418,622 filed March 25, 1954, now Patent No. 2,828,978, comprises an annular body or ring 60 which may take the form of a thin metal stamping disposed in a plane normal to the axis of the coupling part B and surounding the tubular extension 18 of the latter. A plurality of retaining arm and spring locating brackets 65, which also may comprise sheet metal stampings, are disposed at circumferentially spaced points about the tubular extension 18 of the coupling part and are interlocked by arm 67 with the annular body 60 to prevent rotation of the latter relative to the coupling part. Each of the brackets 65 is splinely related to the coupling part B as by integral axially projecting portions 70 received in anchorage recesses which here take the form of axial slots formed at the corners of a hex nut portion 75 of the tubular extension 18 of the coupling part. The extension 70 of the brackets 65 are held in the slots or recesses as by being snap fitted between the nut portion 75 and a surrounding mounting member 80 comprising a metal stamping having a central portion embossed to provide a socket in the shape of the hex nut portion 75 to contain the latter and thereby prevent rotation of the coupling part B relative to the mounting member. The radial flange 80 of the mounting member may be formed with circumferentially spaced apertures and used to mount the coupling part B on a panel or partition as in bulkhead construction of aircraft and the like.

Interposed in the space between the brackets 65 and the annular body 60 of the locking structure D is a deformed or wavy washer 85 of resilient spring metal which tends to separate these parts, biasing the annular body 60 to the right as viewed in Figs. 1 and 2. The spring member 85 is preferably confined between the brackets 65 and the annular ring 60 by bending the ends of arms 67 outwardly at 90° angles to abut against front face 92 of the annular ring 60 thereby limiting the axial separating movement of the brackets and the annular ring. The projection of the arms 67 through the slots in the ring 60 indicates the degree of compression of the spring and hence the condition of the interlock preventing unscrewing of the nut from the coupling part B.

The minimum axial spacing between the brackets and the annular ring may be limited only by the solid height of the spring member 85.

A circular row of inclined locking teeth 90 are formed on the annular body 60 and project axially toward the coupling nut A so as to be engaged by axially projecting inclined teeth 91 integrally formed on the front end of the inner member 4 of the coupling nut. During the final tightening of the coupling nut A on the threads 2 of the coupling part B the nut teeth 91 ride over the teeth 90 of the locking structure in a ratchet action by reason of the inclined surfaces on the teeth, the annular body 60 being displaced axially against the force of the spring 85 to permit such ratcheting and to allow the end face 55 on the body 10 of the coupling part C to be drawn up tightly against the radial locating shoulder 56 on the tubular extension 18 of the coupling part B. When the parts are fully coupled, as shown in Fig. 1, the annular body 60 of the notched locking structure is displaced to the left against the force of the spring 85 from the position which it occupies in the uncoupled condition of the parts shown in Figs. 2 and 3 of the drawings. By reason of the interlocking relationship between the teeth 90 of the locking structure and the teeth 91 of the coupling nut member 4 reverse rotation or unscrewing of the nut member 4 from the threads 2 on the coupling part B is prevented, the slope or slopes of the circumferentially inclined interlocking teeth being such as to permit ratcheting only during the coupling or assembling together of the coupling parts.

The circle of pawl teeth 90 are surrounded by a flat annular surface 92 substantially normal to the thrust axis of the nut assembly and containing slots which receive the bracket arms 67 to hold the parts in assembled relationship.

Multiple part nut structure

To effect release of the interlock between the coupling nut A and the notched locking structure D, the nut embodies an outer member or sleeve 100 which is telescoped over the inner member 4 to surround and virtually completely enclose the latter, being suitably held against relative axial movement while being arranged for limited relative rotary movement. Such circumferential movement of the outer member or sleeve 100 about the inner member 4 is utilized, as by cam action, to effect simultaneous axial shifting of a plurality of release pins 102 carried by the inner member 4. The pins or release elements 102 are guided for axial sliding movement in guideways such as bores 103 drilled or otherwise provided in radial ears or lugs 104 formed integrally on the inner nut member 4. The pins 102 are equally spaced about the circumference of the coupling nut and any desired number may be employed, the even number shown being preferred since the resulting geometry of the coupling nut permits ready gripping by an externally applied wrench of conventional type. By engagement of each pin with its guideway at points axially spaced along the pin axis a distance equivalent to the major portion of the pin length the pins are able properly to direct the axial thrust forces against the locking structure and to resist without bending any circumferential forces applied by the pin actuating means.

Counterbores 106 formed in the lugs or ears 104 from the rear ends of the latter receive helical coil compression springs 107 which embrace the pins and are confined between the radial shoulders at the ends of the counterbores and shoulders 108 on enlarged heads 109 of the pins 102. Desirably the pin heads 109 have sliding fits in the counterbores 106 to guide the axial movement of the pins or release elements.

The radial ears or lugs 104 are of less axial length than the inner nut member 4 so that in the retracted positions of the release elements or pins 102 the heads 109 of the latter project beyond the rearmost ends of the lugs for engagement by cam surfaces 110 carried by the outer nut member or sleeve 100. While it is feasible to employ separate cams or a cam ring secured to the outer sleeve 100, the cams may advantageously comprise portions 112 of an inturned integral flange 114 on the rear end of the outer nut member 100. The inner edge portion of the end flange 114 is received within a retaining ring 115 seated in circumferential groove 116 adjacent the rear end of the inner nut member 4. The retainer 116 may comprise a split ring of resilient metal that snaps into place and grips the inner member 4 to hold it as in the groove 116. In this manner, by engagement of the flange 114 against the retainer 115, the outer sleeve member 100 is held on the inner nut member and prevented from relative axial movement to the right beyond the position shown in Figs. 1 and 3. The springs 107, acting through the release pin elements 102 the heads of which bear against the cam surfaces 110 on the flange of the outer member, normally hold the latter against the retainer 115.

The outer nut member 100 is advantageously formed as by stamping sheet metal to the desired flanged sleeve configuration, the cam surfaces 110 being thus formed as integral parts of the end flange 114 without special machining, the wall thickness of the outer sleeve member of the nut being thus substantially uniform throughout.

In the stamping or other operation by which the outer nut member is made the annular wall of such member is suitably shaped or embossed in the provision of radial projections 117 definitive of recesses 118 which receive the radial lugs or ears 104 of the inner nut member 4. The arcuate length of each of the radial recesses 118 is greater than that of the lug received therein to permit relative rotative movement of the outer nut member on the inner. Such rotative movement draws the inclined cam surfaces 110 across the spherical ends of the heads 109 of the release pins 102 and thereby shifts the pins axially in unison simultaneously to project their ends 119 through the inner end face 120 of the nut member 4 and into bearing engagement against the annular body 60 of the notched locking structure D. The limits of the relative circumferential travel of the outer member 100 about the inner nut member 4 are determined by engagement between opposite radial side faces 121 and 122 of the lugs 104 and circumferentially spaced radial surfaces 123 and 124 at the ends of the recesses 118. The embossed portions 117 of the annular wall of the outer member 100 which define the lug receiving recesses 118 are each of arcuate curvature and generate a common cylindrical surface concentric to the axis of the coupling part, it being understood that the lugs or ears 104 are of uniform radial extent. Similarly portions 126 of the annular wall of the outer member 100 which lie between the embossments 117 closely conform to cylindrically shaped surface portions 127 of the inner nut member 4 which extend between the lugs 104. The outer member 100 thus turns freely with a sliding fit on the inner member over the limited circumferential path permitted by the movement of the lugs 104 in the recesses 118.

*Coupling assembly operation*

In the drawing together of the parts B and C to assemble the coupling, the nut A is turned as for a right-hand thread, it being assumed that the threads 2 on the coupling part B are of such character. Such a turning of the coupling nut corresponds to a counterclockwise rotation as viewed in Fig. 4, the turning torque being transmitted directly from the outer sleeve member 100 to the inner nut member 4 through the engagement of the radial surfaces 123 at the sides of the recesses 118 against the radial lug surfaces 121 simultaneously at a plurality of points distributed about the circumference of the nut. In this coupling operation the head portions 109 of the release pins 102 are received in the deepest portions of the cam surfaces 110 and the release pins are fully retracted, as shown in Fig. 6. The turning force for tightening the coupling is applied to the outer nut member or sleeve 100 in the direction of the arrow in Fig. 6.

*Coupling disassembly operation*

In an uncoupling operation, which necessitates the release of the locking teeth 91 of the nut from the teeth 90 of the locking component or structure before the inner nut member 4 can be unscrewed from the threads 2, the outer nut member or sleeve 100 is turned in a direction reverse to the coupling direction, or clockwise as viewed in Fig. 4. By reason of the rotary lost motion connection between the inner and outer nut members and the resulting movement of the radial lugs 104 across the circumferentially elongated recesses 118, the cam surfaces 110 move over or ride across the heads 109 of the release elements or pins 102 causing the latter to be shifted in unison axially in the guide bores 103 substantially to the positions indicated by broken lines in Fig. 3 and by the full line of Fig. 7. In this lock releasing movement and in the subsequent unscrewing of the nut from the threads 2 the nut components move in the direction indicated by the arrow in Fig. 7.

The axial projection of the release pins 102 through the end face 120 of the inner nut member 4 causes the pins to bear against the annular body 60 of the locking structure C at points spaced uniformly about the circumference of the latter. In this manner the annular body 60 is shifted away from locking position or to the left as viewed in Fig. 1 to release the interlock of the teeth 90 and 91 (see Fig. 7). Continued application of torque to the outer sleeve member 100 of the coupling nut A in the direction of the arrow of Fig. 7 causes the entire nut assembly to turn and thereby effects the unscrewing of the nut from the threads 2 of the coupling part B and the ultimate separation of the two coupling parts. In this unscrewing action the turning torque is transmitted by engagement, simultaneously at a number of points distributed about the circumference of the nut structure, between the radial surfaces 122 of the lugs 104 and the radial surfaces 124 at the sides of the recesses 118.

The outer rotatable hollow body part or member 100 thus substantially encloses the inner body part or member 4 of the union nut A and serves the purpose of an actuator, on forward turning, to drive the inner member having the internal screw threads 3 on to the mating external threads 2 of the coupling part B and also, on reverse turning, to provide the cam surfaces 110 which are thrust against the axially spaced pins 102 contained in the inner member thereby extending said pins axially beyond the pawl teeth 91 of the said inner member a sufficient distance to cause the pawl teeth to be fully disengaged from the mating pawl teeth 90 of the flexible locking ring 60 which locking ring has only spring loaded axial movement on the other coupling part B.

The annular body 60 of the locking structure C is sometimes formed of relatively thin sheet metal and when so formed may have insufficient rigidity to prevent deformation under axial pressure applied as by the release pins 102 which contact the locking structure only at a number of circumferentially spaced points on one side and the spring 85 which contacts circumferentially spaced points on the other side. The staggered or alternate arrangement of the pressure points causes the annular body 60 to bend at the fulcrum points established by the ends of the pins and by the spaced crests of the spring. If the annular body 60 is deformed into a wavy configuration as a result of the conditions mentioned the release of the nut teeth 91 by the locking teeth 90 may not be entirely satisfactory. It is therefore preferred, as illustrated in Figs. 3 and 4, to arrange the nut teeth 91 into groups spaced circumferentially around the end face of the nut. The spacing of the groups of teeth corresponds to the circumferential spacing of the release pins 102, each group of teeth being centered on the axis of one of the release pins. By this arrangement the localized pressure applied to the toothed annular body 60 of the locking structure is closely adjacent the interlocking tooth groups. Portions of the annular toothed body 60 located intermediate the points of pressure application by the release pins 102 are located in confronting relation to circumferentially extending lands 130 on the end of the inner nut body 4 which are devoid of teeth and separate the groups of teeth 91. However, those skilled in the art will realize that the flexible locking ring annular body 60 could be constructed sufficiently heavy and of a material of sufficient strength to resist bending and therefore permit random location of the clusters of fixed teeth 91 with respect to the pins 102, or permit the construction of a full unbroken circle of fixed teeth.

Nut structure with rolled interlock

In a modified version of the nut structure, illustrated in Figs. 8 and 9, the outer or sleeve member 100 is retained on the internal member 4 and held against relative axial shifting by interfitting ribs and grooves on these parts. Circumferential ribs 135 extending across the embossments 117 of the outer member are received in grooves 136 extending transversely across the lugs 104 of the internal nut member. The grooves 136 in the several lugs are preferably milled in the same plane and the ribs 135 are suitably formed as by rolling, the relatively thin metal of the outer member 100 being readily shaped as by means of a rotary tool having an appropriate narrow periphery. This rolling of the internal ridges or ribs 135 is done after the outer sleeve member 100 has been assembled over the inner nut member 4 and after the springs 107 have been assembled on the release pins 102 and the latter inserted in the guideways 103. Thus the rolling of the ribs 135 into the lug grooves 135 effectively locks the parts together, it being understood that the retaining ribs 135 are circumferentially slidable in the grooves 136 to permit relative circumferential movement of the lugs 104 across the recesses 118 when one nut part is rotated relative to the other. By the use of the interlocking groove and rib arrangement of Figs. 8 and 9, eliminating the retaining ring 115, the over-all axial length of the nut may be reduced relative to that required for the nut structure of the preceding figures, although the embodiment of Figs. 1–7 is generally preferred.

Fig. 9 shows the flange plate 80 for mounting the coupling part B in a panel or bulkhead, apertures 137 being provided to receive suitable attaching screws or bolts. The plate 80 is formed of sheet metal as by stamping and has a central hex shaped embossment 139 in the provision of a hex recess 138 that matchingly receives the hex portion 75 on the tubular extension 18 of the coupling part B in non rotative relation.

Nut structure with pressure ring

In Figs. 10 and 11 is illustrated a modification of the invention in which an annular pressure ring 140 is carried by and on the outer ends of the pins 102 for direct engagement with the annular ring body 60 of the notched locking structure D in releasing the ratchet connection. The pins 102 of the embodiment employing the pressure ring 140 are slightly longer than the pins used in the embodiments illustrated in the earlier figures and the forward or projecting ends of the pins, preferably of reduced diameter in the provision of locating shoulders, are received through drill holes or other suitable openings in the ring 140 and are riveted over or otherwise secured in the ring to retain the latter in place.

The ring 140 may be formed of flat metal stock and normally is held flatwise against front end face 120 of the inner nut member 4 by axial retraction of the pins 102 under the biasing action of the compressed springs 107. Outer peripheral edge 144 of the pressure ring is of substantially the same radius as the outer cylindrically curved surfaces of the embossments 117, while inner edge 145 of the pressure ring closely embraces and is guided by the outwardly directed sides of the locking teeth 91. By this arrangement of parts the pressure ring 140 engages the annular ring body 60 of the locking structure D simultaneously about the entire circumferential extent of the latter and closely adjacent the interlocking teeth so that pressure thus applied to the annular body through the ring 140 effects separation of the parts without straining the locking structure C. Deformation of the annular body 60 is avoided, permitting such toothed body to be formed as a stamping of light sheet metal.

As a further advantage of the arrangement employing the pressure ring 140 the latter constitutes a closure for the open ended chambers 118 in the embossments 117 of the outer nut member 100. Thus even under adverse conditions of use in exposed locations dirt and other foreign material are effectively excluded from such chambers. Although the modification shown in Figs. 10 and 11 has certain advantages over the structure shown in Figs. 1–7, the latter is preferred because of its simplicity.

Nut structure with release pins as rotation stops

In Figs. 12–14 is illustrated a modification of the invention in which the circumferential movement of the outer nut member 100 on and relative to the inner nut member 4 is limited by direct engagement or other coaction between the outer member and the release pins 102 rather than by engagement of the radial surfaces 123 and 124 in the embossed recesses of the outer member against the side faces 121 and 122 of the radial lugs 104. The radial flange 114 on the rear end of the outer nut member 100 includes short axial portions 148 joined to the inclined circumferential portions 112 carrying the pin actuating cam surfaces 110. The short flange portions provide shoulders or surfaces 150 engageable against the sides of the heads 109 of the release pins 102, as shown in Fig. 12. Such engagement of the axially extending radial surfaces 150 against the release pin heads limits the rotative movement of the outer nut member 100 on the inner nut member 4 in one direction, such limit of movement being short of the position in which the radial surfaces 123 and 121 of the embossments 117 and lugs 104, respectively, come into contact with one another. Thus the turning of the nut structure in the direction of the arrow of Fig. 12, which corresponds to turning in the direction of the arrow in the embodiment of Fig. 4, to tighten or assemble together the coupling parts, involves the transmission of the turning torque from the sleevelike outer member 100 to the inner threaded nut member 4 through the release pins 102. In reverse or uncoupling rotative movement, as to the release position shown in Fig. 13, the outer nut member 100 moving in the direction of the arrow of Fig. 13, the movement of the several inclined cam surfaces 110 across the rounded ends of the release pin heads 109 shifts the pins axially (to the left as viewed in Figs. 12 and 13). This movement of the release pins projects them through the front end face 120 of the inner nut member to bear axially against the circular outer portion of the annular ring body 60 in the tooth releasing action previously mentioned.

The limit of movement of the outer nut member 100 on the inner nut member 4 is determined by the bottoming of the release pins at the desired limit of their axial travel in the guide bores 103. Such bottoming may be effected by designing the springs 107 to be completely compressed at the desired limit of movement, or, preferably, and as illustrated, by the provision of counterbores 154 and 155 coaxial to the guide bores 103 and of appropriate diameters, respectively, to accommodate the compression springs 107 and the enlarged cylindrical heads 109 of the release pins. At the inner ends of the counterbores 155 where the diameter is reduced to that of the counterbores 154 there are thus provided circular shoulders 156 for engagement by the shoulders 108 on the inner ends of the release pin heads 109. Upon reverse or uncoupling rotative movement of the outer nut member 100 as in the direction of the arrow in Fig. 13 the bottoming of the release pins 102 by engagement of the head shoulders 108 against the counterbore shoulders 156 stops axial travel of the release pins in the guide bores and by reason of the geometry of the parts prevents further sliding of the cam surfaces 110 across the heads of the release pins to thereby limit relative rotative movement of the outer nut member on the inner without engagement between the radial surfaces 122 of the lugs 104 and the internal surfaces 124 of the embossments 117. By the arrangement described in connection wtih Figs. 12–14 the positive projection of the release pins 102 to the full release position shown in Fig. 13 is assured, since the relative rotative movement of the inner and outer nut parts is controlled in the uncoupling or release direction of rotation by the bottoming of the release pins. Automatic compensation is thus obtained for wear and looseness of the parts.

*Nut structure with flat strip release pins*

In Figs. 15–18 is illustrated a modification of the invention wherein the cylindrically shaped rodlike release pins 102 previously described are replaced by relatively flat pins 160 guided and having sliding fits in axial grooves or slots 161 in the lugs 104. The pins 160 are held captive in the open top slots 161 by the outer walls of the embossments 117 which are cylindrically curved and closely overlie the outwardly directed faces of the lugs. Axial movement of the rectangularly sectioned pins 160 is effected by cam action, the pins being provided with suitable heads and retraction springs corresponding to the heads and springs previously described or, if desired, the pins 160 may be made of spring metal and formed as shown with integral angularly disposed end portions 162. Straight strip stock may be bent at 163 to provide the angularly disposed end portions 162 which in the normal or unstressed condition of the pins are disposed at acute angles to the body portions which slide in the guide grooves 161. The bends 163 of the release pins present convexly curved end surfaces for engagement by the cam surfaces 110 of the outer nut member, the relative rotation of one nut member on the other acting, as previously described, to shift the release pins axially in the lugs 104. The parts are proportioned so that the angularly disposed end portions 162 of the release pins engage and react against radial rear edge corners 165 of the lugs 104. During the releasing or uncoupling movement of the outer nut member, as in the direction of the arrow of Fig. 16, the release pins are distorted by the coaction of the edge corners 165 of the lugs and the cam surfaces 110 of the outer nut member and the release pins are projected axially through the guideways 161 to the release positions shown. Upon turning of the outer nut member 100 as in the direction of the arrow of Fig. 15 in the assembling operation the inherent resiliency of the release pins 160 serves to retract the pins in the guideways 161 by the reaction of the end portions 162 against the lugs 104.

The present invention is thus seen to provide a coupling or unit nut for use in combination with a locking structure in a ratchet type coupling. The use of an inner nut member of relatively heavy section in combination with an outer member of relatively light section permits the advantageous formation of these parts by forging or extrusion and stamping, respectively, and avoids costly machining operations. Release of an interlocking connection between teeth on a locking structure and teeth on one of the nut members, here the inner nut member, is positively obtained by the action of axially slidable pins carried by one of the nut members. Simultaneous actuation of the several release pins which are spaced circumferentially about the nut structure is effected by relative rotation of one nut member on the other by cam action and wholly without relative axial movement of the nut members.

In the use of an outer nut member comprising a metal stamping, actuating cams are conveniently formed in such outer nut member in the stamping operation. The stamping of the outer nut member may also form it with radial projections or embossments shaped and spaced to receive interlocking lugs or ears on the inner nut member and may character or configure the outer nut member so that it is readily gripped for turning either manually or by a suitable tool.

The components which comprise the two coupling parts B and C are so proportioned that in joining them together the inner seal between the one axially movable valve body 32 and the seat inside the tubular extension 18 is broken before the outer seal is accomplished between the end face 40 of the tubular extension 18 and the end face 41 of the other axially movable valve body or sleeve 42. The seal between the axially movable sleeve 42 and the fixed valve seat member 11 is broken subsequent to the effecting of the seal between the sleeve 42 and the said end face of the other coupling part. By this sequence of operations wherein one of the inner seals is broken prior to completion of the outer seal there is obtained an automatic bleeding of air from between the coupling parts and the undesirable antrapment of air is avoided. In the uncoupling of the device the sequence is reversed, in that the outer seal between the end faces 40 and 41 is broken before completing the one inner seal between the valve body 32 and the tubular extension 18.

The time interval between the breaking of the one inner seal and the accomplishment of the outer seal in the coupling together operation must be very small and must not permit an objectionable amount of hydraulic liquid or other fluid to escape from the conduit to which the coupling part B is attached. It has been found, for example, that for normal use a satisfactory arrangement using recessed rubber seals as shown is one in which the valve seating member 11 engages the valve body 32 for travel of the latter of the order of about .015" before the end 40 on the tubular extension 18 engages the end 41 of the movable valve sleeve 42 and shifts the latter to effect the seal between the coupling parts. This .015" preliminary travel of the valve body 32 is not critical, however, and satisfactory operation is obtained with less, or even more, preliminary travel, the change in dimension being accompanied, of course, by a corresponding change in the amount of fluid that escapes during the coupling and uncoupling operation. The fluid loss is also controlled by the amount the rubber seals project above the surfaces in which they are embedded, or recessed, some slight projection being essential to insure fluid tight seals.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. A nut structure of the character described for use in combination with a notched locking component in a ratchet type coupling connection, said nut structure comprising in combination, an inner hollow body member having external radially directed axial lugs, an outer hollow cap member embracing the body member, and means securing the members together for relative rotation, said cap member being formed of relatively thin metal of substantially uniform thickness and having internal recesses to receive the lugs of the inner member and external knobs to facilitate gripping the cap member for turning the structure, said recesses coinciding in number and location with the knobs and the recesses each being of greater circumferential extent than the lug respectively received thereby to permit limited rotary movement of the cap member on the body member, a plurality of teeth projecting axially from one end of the body member for engagement with the notches of the locking component in the establishment of an interlock, release elements mounted in the lugs and being longer than the lugs and guided for axial sliding movement in opposite directions between extended positions, in which the release elements bear against the locking component to effect relative separating movement of the latter from the body member of the nut structure to release a locking engagement therebetween, and retracted positions, in which the release elements are withdrawn from bearing against the locking component to permit coaction between the latter and the body member of the nut structure in the establishment of a locking engagement therebetween, and cam means carried by the cap member for coaction with the release elements to effect their simultaneous axial movement upon relative rotation of the cap and body members, and means to cause the release elements to retract upon relative rotation of the members in the opposite direction.

2. A locking nut structure for use as one part of a coupling assembly of the type comprising cooperating parts adapted to be engaged and held together by relative rotation in one direction, disengaged for separation by relative rotation in a reverse direction and in which the other part includes an axially yieldable locking element the nut structure comprising an inner hollow body member and an outer cooperating sleeve member embracing and circumferentially continuous about the entire periphery of the inner member and means securing the sleeve to the inner member for relative rotation, said inner member having thread means for engagement with the other part and formations on one end face for engagement with such locking element, said inner member being integrally formed with a plurality of external axially extending and radially projecting lugs, said lugs being spaced circumferentially of the inner member and separated by intervening axially extending outwardly opening recesses, the outer sleeve member being embossed at a plurality of circumferentially spaced points in the provision of a circumferential series of radially outwardly projecting axial ridges and intervening grooves to facilitate obtaining an effective grip on the sleeve member in turning the nut structure, the ridges of the sleeve member being hollow in the provision of internal slots within which are received the lugs of the inner body member, portions of the sleeve member intermediate its ridges being received in the recesses of the body member between the lugs of the latter and being of less circumferential extent than said recesses, the lugs being of less circumferential extent than the internal slots of the sleeve member to permit limited rotative movement of the sleeve member on and relative to the body member, said lugs each being formed with a guideway parallel to the rotational axis of the structure, a plurality of elongated release elements each having a forward and a rearward end, said release elements being longer than said guideways and being received and guided in the guideways of the lugs for endwise reciprocating movement between retracted positions for locking engagement of said end face formations with the yieldable locking element and extended positions in which their forward ends project beyond said one end face of the body member to engage the yieldable locking element in releasing the latter from said end face formations, and a camming means on the sleeve member coacting positively with the release elements upon and during relative rotative movement of the members in one direction and between predetermined limits to shift the release elements in unison from retracted to projected positions, and means to cause the release elements to retract upon relative rotation of the members in the opposite direction.

3. A locking nut structure substantially as defined in claim 2 in which the sleeve member has internal axially extending radial surfaces in pairs, each pair of such surfaces is within and spaced less than the circumferential extent of one of the ridges, the lugs each have external oppositely directed radial surfaces, and said radial surfaces of each lug confront and are spaced less than the pair of radial surfaces within one of the sleeve member ridges for engagement with the latter in establishing a positive turning lost motion connection between the members.

4. A locking nut structure as in claim 2 in which the rearward ends of the release elements project beyond the lugs at the other end of the body member and the sleeve member is formed with integral inturned flange means of substantially the same circumferential extent as the ridges engageable with said projecting rearward ends of the release elements to effect said shift.

5. A locking nut structure as in claim 2 in which the lugs are formed with bores parallel to the rotational axis of the structure and the release elements comprise pins slidable in the bores.

6. A locking nut structure as in claim 2 in which the lugs are formed with bores parallel to the rotational axis of the structure, the release elements comprise pins slidable in the bores and said retracting means comprises springs which embrace the pins and react against the body member and the pins to bias the latter toward retracted positions.

References Cited in the file of this patent

UNITED STATES PATENTS

| | | |
|---|---|---|
| 645,754 | McFarland | Mar. 20, 1900 |
| 991,379 | Shinn | May 2, 1911 |
| 1,033,585 | Hickey et al. | July 23, 1912 |
| 1,509,948 | Hall | Sept. 30, 1924 |
| 1,646,805 | Bell | Oct. 25, 1927 |
| 1,857,420 | Wolford | May 10, 1932 |
| 2,377,575 | Ringer | June 5, 1945 |
| 2,393,764 | Frank | Jan. 29, 1946 |
| 2,456,045 | Brock | Dec. 14, 1948 |
| 2,489,919 | Merriman | Nov. 29, 1949 |
| 2,498,104 | Branday | Feb. 21, 1950 |
| 2,648,548 | Scheiwer | Aug. 11, 1953 |